March 6, 1934.                    E. E. HICKEN                    1,950,239
                              STOKER CONVEYER TROUGH
              Filed Dec. 6, 1929                    4 Sheets-Sheet 1
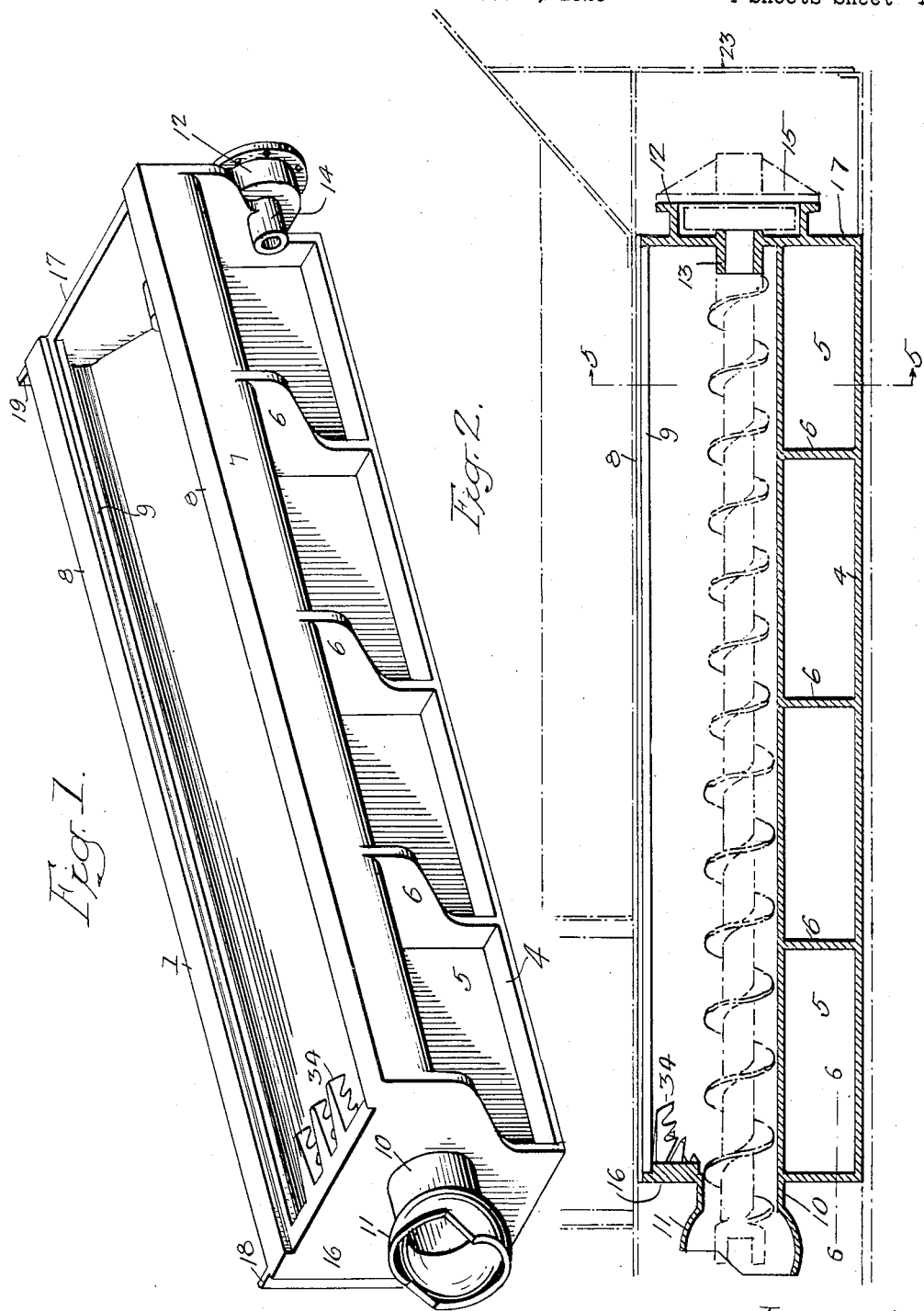
Inventor:
Elmer E. Hicken
by his Attorneys

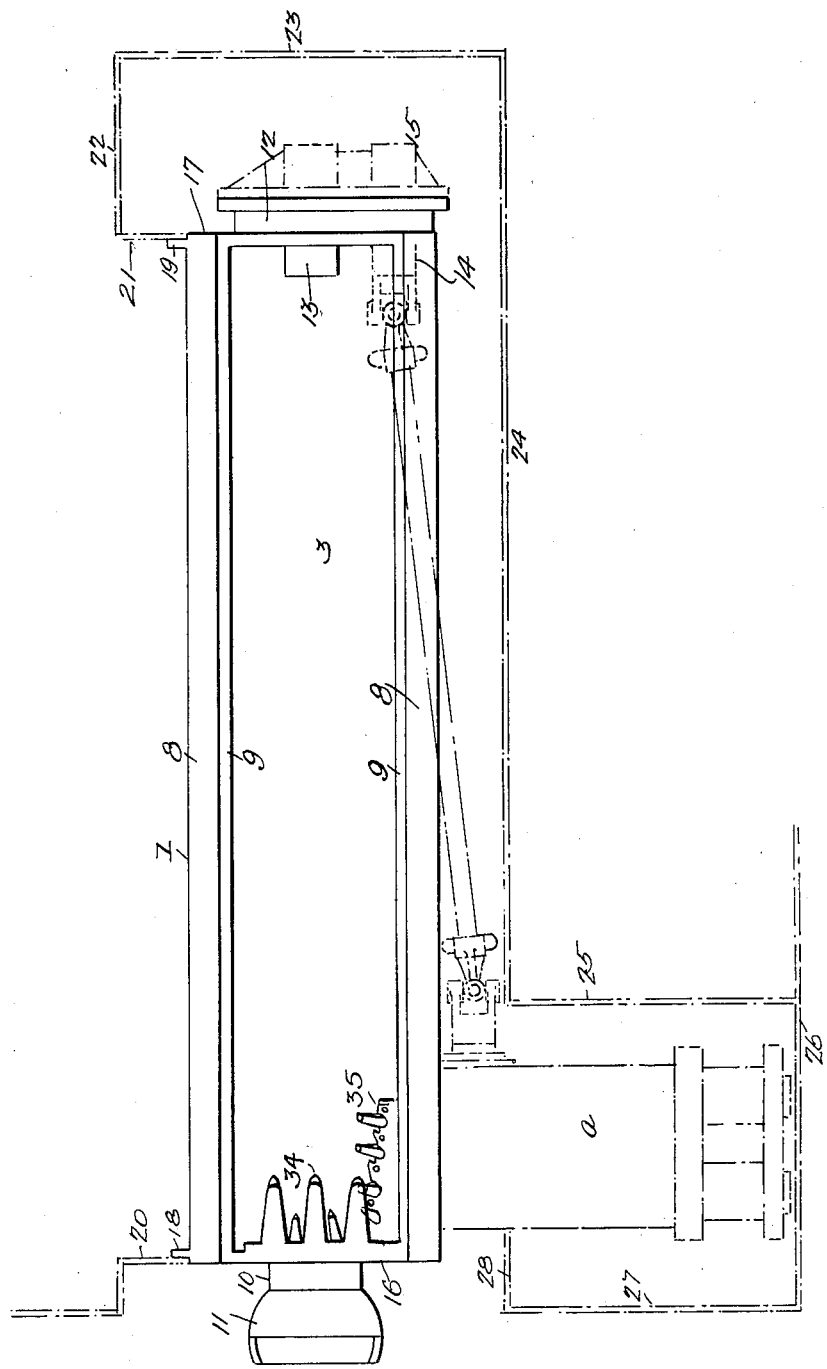

March 6, 1934.   E. E. HICKEN   1,950,239
STOKER CONVEYER TROUGH
Filed Dec. 6, 1929   4 Sheets-Sheet 3
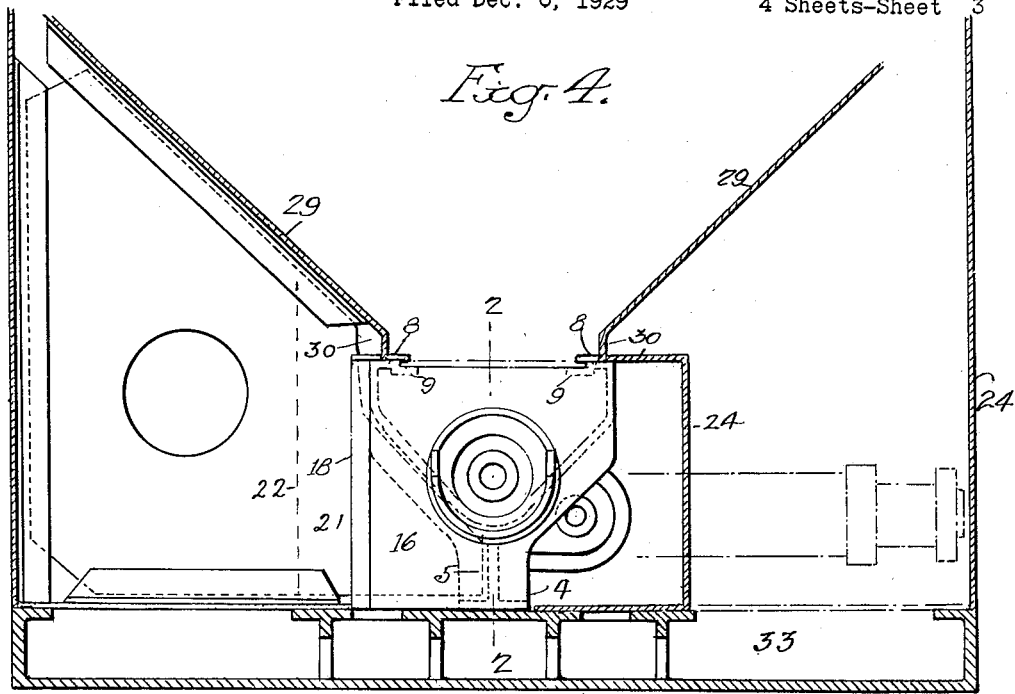
Fig. 4.
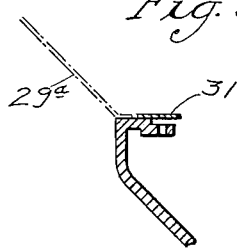
Fig. 9.
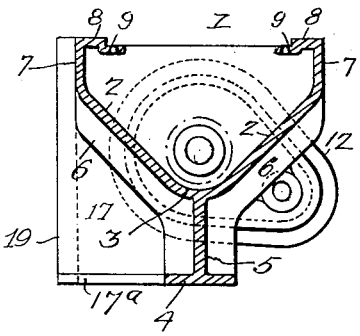
Fig. 5.
Fig. 11.
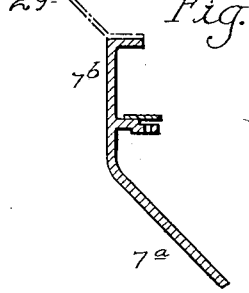
Fig. 10
Inventor:
Elmer E. Hicken
by his Attorneys March 6, 1934.    E. E. HICKEN    1,950,239
STOKER CONVEYER TROUGH
Filed Dec. 6, 1929    4 Sheets-Sheet 4
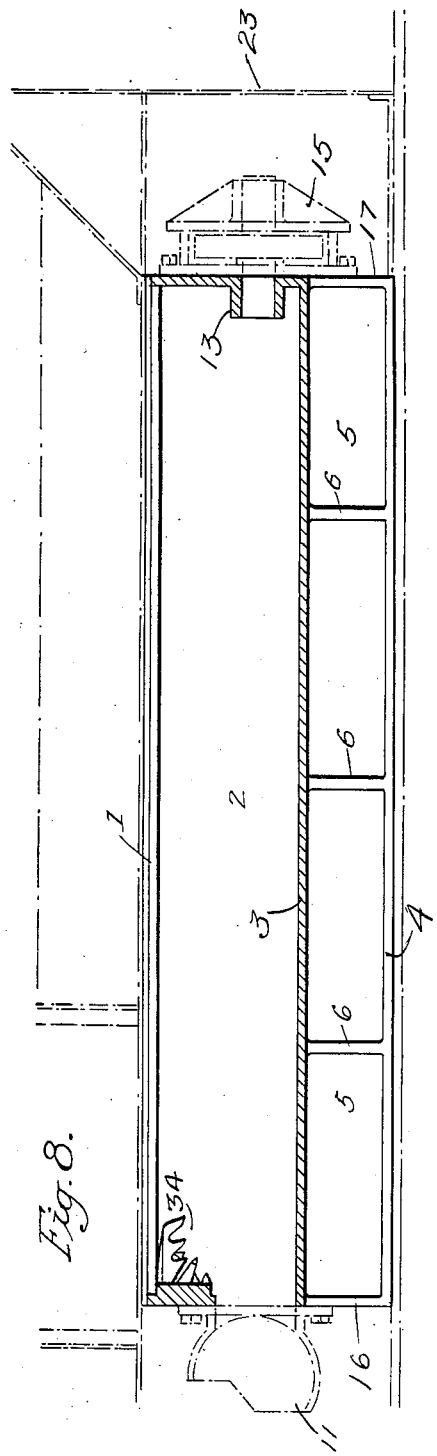
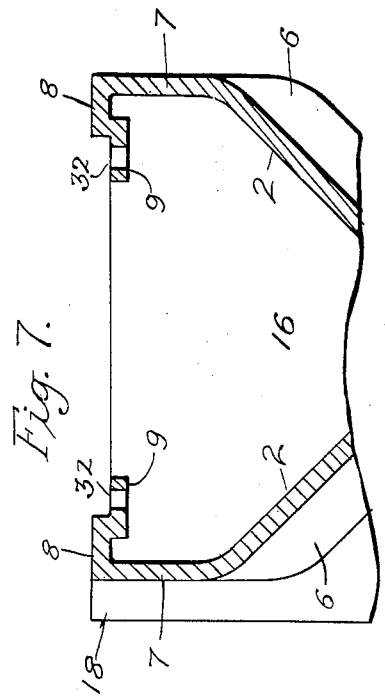
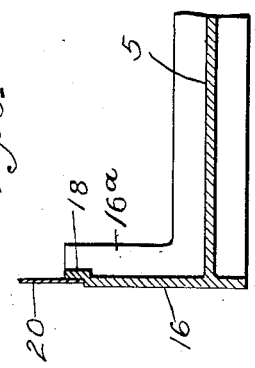
Inventor.-
Elmer E. Hicken
by his Attorneys Patented Mar. 6, 1934

1,950,239

UNITED STATES PATENT OFFICE 1,950,239

STOKER CONVEYER TROUGH

Elmer E. Hicken, Collingswood, N. J.

Application December 6, 1929, Serial No. 412,171

5 Claims. (Cl. 105—234)

My invention relates to certain improvements in tenders using stoking mechanism.

The object of my invention is to make the conveyer trough of the stoker in a single casting, which is attached to the body of the tender by welding or other means, and to increase the water capacity without increasing the over-all dimensions of the tank.

A further object of the invention is to make the crushers at the discharge end of the trough integral with the trough. The invention also relates to other details which will be described hereinafter.

In the accompanying drawings:

Fig. 1 is a perspective view of my improved conveyer trough;

Fig. 2 is a longitudinal sectional view on the line 2—2, Fig. 4;

Fig. 3 is a plan view of the trough showing parts of the tender partitions in dotted lines;

Fig. 4 is an end view of the trough and sufficient of the tender to illustrate my invention;

Fig. 5 is a sectional view of the trough on the line 5—5, Fig. 2;

Fig. 6 is a sectional plan view on the line 6—6, Fig. 2;

Fig. 7 is an enlarged sectional view of the upper portion of the trough;

Fig. 8 is a plan view of the trough showing a part of the ball joint made separate from the trough and the gearing housing also made separate therefrom; and Figs. 9, 10 and 11 are views illustrating slight modifications of the method of securing the trough to the inclined side plates of the hopper portion of the tender.

Referring to Figs. 1, 2 and 3, 1 is the conveyer trough of the tender having inclined sides 2 and rounded bottom section 3, which is substantially the same shape as the lower section on a screw conveyer which is located in the trough and is shown by dotted lines in Fig. 2. Extending in the present instance the full length of the trough is a foot plate 4, which is connected to the trough proper by a longitudinal web 5, and projecting laterally from this web at intervals are reinforcing brackets 6, which are cast integral with the structure.

The upper end of the trough in the present instance has vertical sides 7 and at the upper end of each side is an inturned longitudinal flange 8 having an offset portion 9, which support the movable plates for controlling the flow of coal to the hopper. In the offset portion 9 of the flanges 8 of the trough are holes 32, which are spaced a given distance apart. These holes are either formed by cores or by drilling. The holes prevent the accumulation of material on the offset portion 9, which would prevent the proper operation of the slides which control the flow of coal to the trough.

At the forward end of the trough is a neck 10, terminating in a spherical segmental member 11 of a ball joint, as shown in Figs. 1 and 2, this neck and segmental member being made integral with the trough. The conveyer tube which receives the coal from the trough is connected to this member 11 and the coal is carried through this tube into the fire box of the locomotive by a conveyer, preferably a screw conveyer, (not shown).

In the rear end of the trough is a housing 12 for the gearing which drives the conveyer. Projecting into the trough is a bearing 13 for the screw conveyer and at one side of the trough is a bearing 14 for the driving shaft, which is connected to the stoker engine $a$. This engine is located at one side of the trough near the forward end of the tender in the present instance.

The cap 15 shown by dotted lines in Fig. 2 has also bearings for the two shafts, these bearings being in line with the bearings 13 and 14.

In some instances the trough may be made as shown in Fig. 8, in which the neck at the discharge end of the trough and the housing for the gearing at the opposite end of the trough, may be made separate from the trough and may be secured thereto by welding or other means.

The trough at the side opposite the side at which the engine $a$ is mounted has vertical front and rear plates 16 and 17 and these plates have vertical fins 18 and 19, respectively. The forward end plate 20 of the tender is secured to the fin 18 by welding, bolting, or riveting, as shown in Fig. 6, and the partition plate 21 is secured to the fin 19 by riveting, bolting, or welding. This partition plate 21 is connected to a longitudinal plate 22, which in turn is connected to a transverse plate 23 at the rear of the trough. The plate 23 in turn is connected to a longitudinal plate 24, which extends to the engine space as shown by dotted lines in Fig. 3. The engine $a$ is enclosed by plate 25, side plate 26, and end plates 27 and 28, the plate 25 being attached to the plate 24 so that all available space not used for the stoker mechanism can be used for water.

The foot plate 4 is welded, bolted or riveted to the underframe 33 of the tender as shown in Fig. 4, and the front and rear plates 16 and 17 are flanged as shown at 16$a$ and 17$a$ respectively, by which the flanges are welded, bolted or riveted to the tender structure. As shown in Fig. 4, the underframe 33 is made hollow and communicates with the water chamber of the tender so as to increase the water capacity of the tender but in some instances the underframe may be made of longitudinal beams with solid plates resting on the upper portion of the beams, the spaces between the beams being open to the atmosphere, without departing from the essential features of the invention, as the invention relates mainly to the structure of the trough.

Where crushers are used at the discharge end of the trough, these crushers may be made integral with the trough as shown in Figs. 1, 2 and 3. 34 are the main crushers which consist of a series of fingers projecting from the end of the trough and having teeth at their lower edges, while the auxiliary crushers 35 consist of a series of fingers beveled at their lower edges.

In Fig. 4 I have shown one method of attaching the inclined hopper plates 29 to the cast trough. In this instance, the portions 30 are welded to each side of the trough and longitudinal plates 31 extend over the slideways acting to hold the slides in position on the flanges 8.

In Fig. 9 I have shown a modification, in which the inclined plates 29a extend directly to the trough and have flanges which are secured to the upper surface of the trough.

In Fig. 10 I have illustrated another modification, in which the sides 7a of the trough are extended as at 7b and the inclined plates 29b are secured to a flange on this extended section of the trough; and in Fig. 11 I have shown an extension 7c without the flange and the inclined plate 29c having a flange which is welded, or riveted to the outside of the extension 7c.

By the above description it will be seen that the conveyer trough of the stoking mechanism of a tender is made separate from the tender structure and is in the form of an integral casting. The foot plate of the improved trough is welded or otherwise secured to the underframe of the tender, and the neck and the spherical segmental member 11 are preferably formed as an integral part of the trough, as well as the gear housing at the opposite end of the trough. The crushers at one end of the trough are preferably cast integral with the structure. By this construction additional water space is added to the tender without increasing the over-all dimensions of the tank and a very substantial trough is produced, which can be readily secured in position in the tender structure. While certain arrangement of plates forming the walls of the tender is shown in Fig. 4 and in dotted lines in Fig. 3, it will be understood that this arrangement may be modified without departing from the essential features of the invention.

I claim:

1. A stoker conveyer trough for a tender, having a body portion; a vertical web extending the full length of the body portion; and a foot plate at the base of the web, the structure being made as an integral casting.

2. A stoker conveyer trough having a body portion; a vertical web extending the full length of the body portion and a foot plate at the base of the web; transverse brackets joining the body portion, the vertical web and the foot plate; a discharge neck at one end of the body portion; a spherical segmental member at the end of the neck; and a gear housing at the opposite end of the trough from the neck, said housing having bearings for a screw conveyer shaft, the entire structure being made in a single casting.

3. A stoker conveyer trough having a longitudinal web extending to the base of the bottom frame of the tender, and having solid plates at the forward and rear ends, said plates projecting at one side of the trough only so as to form a partition wall, separating the water space of the tender from the space for the stoker engine and its parts, the said trough, web, and rear plates being made as an integral casting.

4. A stoker conveyer trough for a locomotive tender having a body portion; a vertical web extending the full length of the body portion; a foot plate at the base of the web; and plates at each end of the trough having flanges at their bases constituting extensions of said foot plate, the trough being made as an integral casting.

5. The combination in a tender, of an underframe, the tender body mounted on the underframe; a cast metal conveyer trough having a vertical web; a foot plate and end plates, made integral therewith; inclined plates separating the fuel section from the water section of the tender and attached at their lower ends to the conveyer trough; and plates at one side of the trough forming a chamber for the engine by which the conveyer is driven, said conveyer trough forming a partition separating the engine space from the water section of the tender.

ELMER E. HICKEN.